(12) United States Patent
Oshita et al.

(10) Patent No.: US 11,143,192 B2
(45) Date of Patent: Oct. 12, 2021

(54) ELECTRIC SUPERCHARGER AND SUPERCHARGING SYSTEM

(71) Applicant: KABUSHIKI KAISHA TOYOTA JIDOSHOKKI, Kariya (JP)

(72) Inventors: Makio Oshita, Aichi (JP); Toshihiro Yamamichi, Aichi (JP); Kiyoshi Uetsuji, Aichi (JP); Satoshi Umemura, Aichi (JP)

(73) Assignee: KABUSHIKI KAISHA TOYOTA JIDOSHOKKI, Kariya (JP)

( * ) Notice: Subject to any disclaimer, the term of this patent is extended or adjusted under 35 U.S.C. 154(b) by 372 days.

(21) Appl. No.: 15/129,018

(22) PCT Filed: Mar. 19, 2015

(86) PCT No.: PCT/JP2015/058255
§ 371 (c)(1),
(2) Date: Sep. 26, 2016

(87) PCT Pub. No.: WO2015/151835
PCT Pub. Date: Oct. 8, 2015

(65) Prior Publication Data
US 2017/0101995 A1  Apr. 13, 2017

(30) Foreign Application Priority Data

Apr. 1, 2014  (JP) .............................. JP2014-075360

(51) Int. Cl.
*F04D 25/06* (2006.01)
*F04D 25/08* (2006.01)
(Continued)

(52) U.S. Cl.
CPC .......... *F04D 25/0606* (2013.01); *F02B 37/04* (2013.01); *F02B 39/00* (2013.01);
(Continued)

(58) Field of Classification Search
CPC .... F04D 25/02; F04D 25/0606; F04D 25/062; F04D 25/064; F04D 25/08; F04D 25/16;
(Continued)

(56) References Cited

U.S. PATENT DOCUMENTS

| | | | | |
|---|---|---|---|---|
| 5,114,320 A | * | 5/1992 | Kabelitz | ............... F04D 29/063 184/6.23 |
| 5,425,345 A | * | 6/1995 | Lawrence | ............... F02B 33/40 123/559.1 |
| 6,102,672 A | | 8/2000 | Woollenweber et al. | |
| 6,192,871 B1 | * | 2/2001 | Middlebrook | .......... F01N 13/20 123/196 R |

(Continued)

FOREIGN PATENT DOCUMENTS

| | | |
|---|---|---|
| DE | 10 2008 061 113 A1 | 6/2010 |
| EP | 2 397 744 A2 | 12/2011 |

(Continued)

OTHER PUBLICATIONS

Communication dated Mar. 17, 2017 from the European Patent Office in counterpart Application No. 15774295.8.

*Primary Examiner* — Dominick L Plakkoottam
*Assistant Examiner* — Charles W Nichols
(74) *Attorney, Agent, or Firm* — Sughrue Mion, PLLC

(57) ABSTRACT

An electric supercharger that can reduce vibration amplitude in an end of a shaft due to rotational vibration is provided. An electric supercharger 101 comprises: an impeller 40 for supercharging a fluid by rotation; an impeller chamber 15 for accommodating the impeller 40; a motor 30 for driving the impeller 40 to rotate; and a motor chamber 18 for accommodating the motor 30. An opening 28 is provided between the impeller chamber 15 and the motor chamber 18 wherein the fluid is able to pass therethrough. Seal structures 50, 51, 52 are provided for separating the motor chamber 18 from the exterior at portions other than the opening 28.

7 Claims, 2 Drawing Sheets

(51) Int. Cl.
  *F04D 25/16* (2006.01)
  *F04D 29/056* (2006.01)
  *F04D 29/053* (2006.01)
  *F04D 29/66* (2006.01)
  *F02B 39/00* (2006.01)
  *F02B 39/10* (2006.01)
  *F02B 37/04* (2006.01)
  *F04D 29/08* (2006.01)
  *F04D 29/059* (2006.01)
  *F04D 29/42* (2006.01)

(52) U.S. Cl.
  CPC .............. *F02B 39/10* (2013.01); *F04D 25/08* (2013.01); *F04D 25/16* (2013.01); *F04D 29/053* (2013.01); *F04D 29/056* (2013.01); *F04D 29/059* (2013.01); *F04D 29/083* (2013.01); *F04D 29/4206* (2013.01); *F04D 29/668* (2013.01); *Y02T 10/12* (2013.01)

(58) Field of Classification Search
  CPC ...... F04D 29/053; F04D 29/056; F04D 29/08; F04D 29/083; F04D 29/403; F04D 29/5806; F02B 37/04; F02B 39/00; F02B 39/10; Y02T 10/12
  See application file for complete search history.

(56) References Cited

U.S. PATENT DOCUMENTS

| | | | | |
|---|---|---|---|---|
| 6,449,950 | B1* | 9/2002 | Allen | F01D 25/166 417/407 |
| 6,907,867 | B2* | 6/2005 | Igarashi | F02B 29/04 123/564 |
| 7,367,190 | B2* | 5/2008 | Shibui | F01D 25/125 290/52 |
| 7,384,198 | B2* | 6/2008 | Gotoh | F16C 19/06 384/490 |
| 2006/0177333 | A1* | 8/2006 | Sakuda | F16C 33/78 418/55.3 |
| 2009/0056681 | A1 | 3/2009 | Shibui et al. | |
| 2011/0038719 | A1* | 2/2011 | Wollstadt | F04D 17/10 415/177 |
| 2011/0146274 | A1 | 6/2011 | Shimizu et al. | |
| 2014/0090626 | A1 | 4/2014 | An et al. | |

FOREIGN PATENT DOCUMENTS

| | | |
|---|---|---|
| JP | 03-015696 A | 1/1991 |
| JP | 2001-515991 A | 9/2001 |
| JP | 2007-40255 A | 2/2007 |
| JP | 2009-299522 A | 12/2009 |
| JP | 2013-227889 A | 11/2013 |
| WO | 2013/011839 A1 | 1/2013 |

* cited by examiner

ELECTRIC SUPERCHARGER AND SUPERCHARGING SYSTEM

CROSS REFERENCE TO RELATED APPLICATIONS

This application is a National Stage of International Application No. PCT/JP2015/058255 filed Mar. 19, 2015, claiming priority based on Japanese Patent Application No. 2014-075360 filed Apr. 1, 2014, the contents of all of which are incorporated herein by reference in their entirety.

TECHNICAL FIELD

The present invention relates to an electric supercharger and a supercharging system.

BACKGROUND ART

Among superchargers, there are electric superchargers comprising a compressor portion and a motor portion wherein a shaft transfers power. The shaft is located straddling the compressor portion and the motor portion, so it is known to provide a seal structure for separating the compressor portion from the motor portion around the shaft. Patent Document 1 describes an example of such a construction.

CONVENTIONAL ART DOCUMENTS

Patent Document

[Patent Document 1] Japanese Patent Application Laid Open No. 2013-227889

SUMMARY OF THE INVENTION

Problems to be Solved by the Invention

However, conventional constructions have a problem in that the amplitude of vibration at one end of the shaft due to rotational vibration becomes large. That is, the seal structure has to be located at a position which is closer to the end than a bearing of the shaft, so an overhanging portion of the shaft becomes long, and as a result the amplitude of the vibration in the end of the shaft becomes large.

The present invention is made in order to solve this problem and is aimed at providing an electric supercharger and a supercharging system that can reduce the amplitude of vibration in the end of the shaft due to rotational vibration.

Means for Solving the Problems

In order to solve the above problem, an electric supercharger related to the present invention comprises:
an impeller for supercharging a fluid by rotation;
an impeller chamber for accommodating the impeller;
a motor for driving the impeller to rotate;
a motor chamber for accommodating the motor;
an opening provided between the impeller chamber and the motor chamber, wherein the fluid is able to pass therethrough; and
a seal structure for separating the motor chamber from an exterior at portions other than the opening.

Also, a supercharging system related to the present invention comprises:

a first supercharger which is the above electric supercharger; and
a second supercharger provided downstream of the first supercharger.

Effect of the Invention

According to the electric supercharger and the supercharging system related to the present invention, the seal structure between the impeller chamber and the motor chamber is unnecessary, so the overhanging portion of the shaft can be shorter, thereby reducing the amplitude of the vibrations in the end of the shaft.

EMBODIMENTS OF THE INVENTION

Embodiments of the present invention will be explained below on the basis of the attached drawings.

First Embodiment

First, a construction of the electric supercharger 101 related to the first embodiment of the present invention will be explained below.

Figure 1:
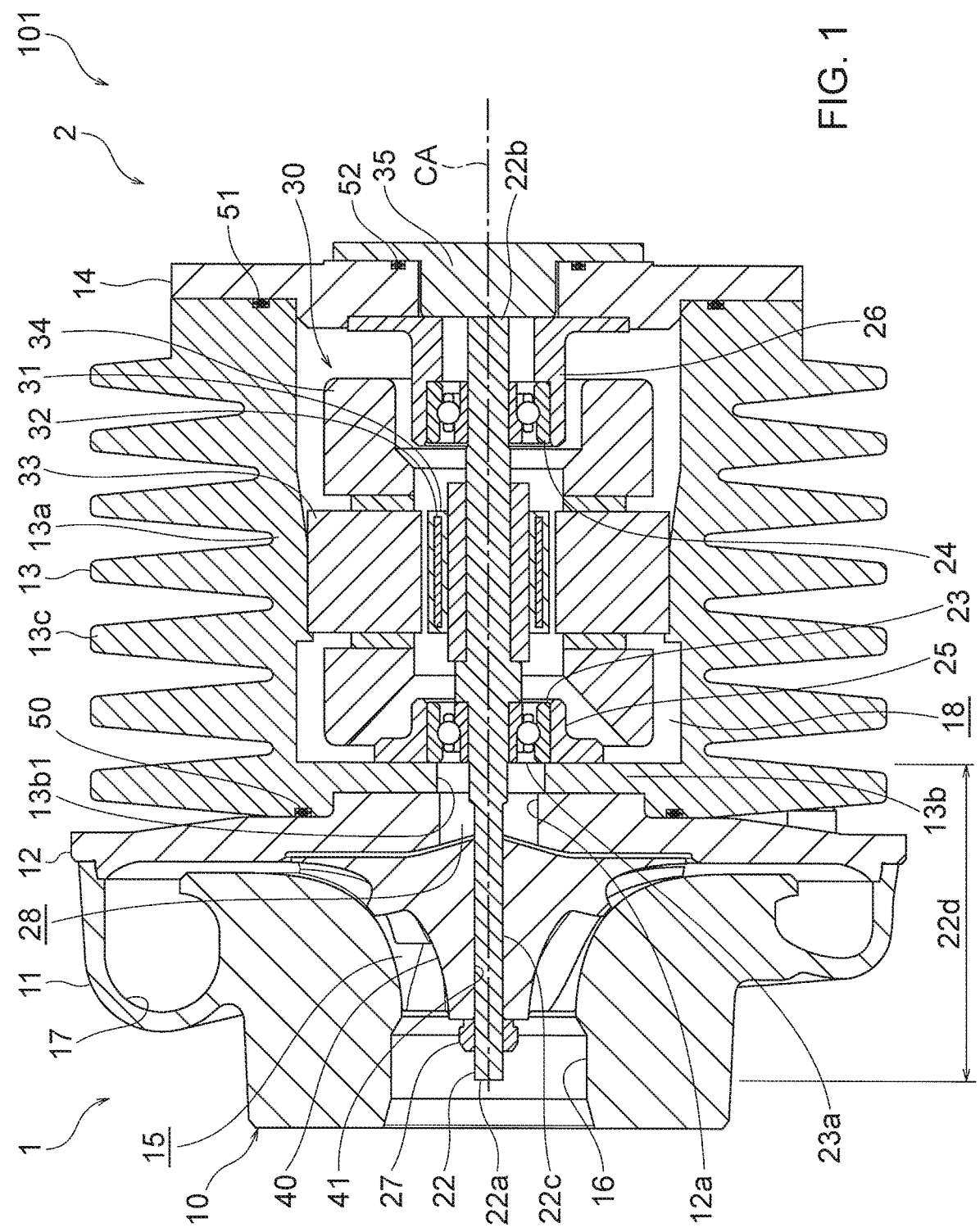
FIG. 1 is a cross-sectional side view showing a construction of an electric supercharger related to a first embodiment of the present invention.

Referring to FIG. 1, the electric supercharger 101 is constituted by a supercharging portion 1 for supercharging intake fluid (gas for example and air in the present embodiment) and a driving portion 2 for driving the supercharging portion 1 by using an electric motor 30 which is a rotating electric machine.

The supercharging portion 1 comprises an impeller 40 for supercharging intake air by rotation, a shaft 22 integrally rotatable with the impeller 40, a compressor cover 11 and a seal plate 12. The compressor cover 11 and the seal plate 12 are for example made of a metal and assembled together to accommodate the impeller 40 inside. Here, the shaft 22 constitutes a rotating shaft.

The shaft extends from inside the compressor cover 11 to the driving portion 2 through the seal plate 12. In this state, the seal plate 12 extends in a radial direction of the shaft 22.

In an interior surrounded by the compressor cover 11 and the seal plate 12, an impeller chamber 15, an intake path 16 and an annular discharging path 17 are formed. The impeller chamber 15 accommodates the impeller 40 to be rotatable. The intake path 16 extends from the impeller chamber 15 in an axial direction of the shaft 22 and opens externally. The discharging path 17 is connected to the impeller chamber 15, extends to surround a periphery of the impeller 40 and opens externally.

The driving portion 2 comprises a motor case 13, an end plate 14 and a rear end member 35. The motor case 13 is made of a metal in a cylindrical shape having a bottom. The end plate 14 and the rear end member 15 close an opening of the motor case 13. The motor case 13, the end plate 14 and the rear end member 35 form a motor chamber 18 accommodating the electrical motor 30 inside. Here, the motor chamber 18 constitutes a rotating electric machine chamber.

On the periphery of a cylindrical side wall 13*a* of the motor case 13, a plurality of radiation fins 13*c* are formed integrally therewith and protruding therefrom in order to enhance cooling efficiency of the motor case 13 by circumambient air.

Also, the compressor cover 11, the seal plate 12, the motor case 13, the end plate 14 and the rear end member 35 form a housing 10 of the electric supercharger 101.

The seal plate 12 is fixed to a bottom wall 13*b* which is a bottom portion of the motor case 13. Also, at the center of the bottom wall 13*b*, a bottom wall through hole 13*b*1 is formed therethrough which opens within the motor chamber 18 and opens toward the seal plate 12. The bottom wall through hole 13*b*1 has an inner diameter greater than an outer diameter of the shaft 22 so that the shaft 22 passes therethrough. Also, the bottom wall 13*b* extends in a radial direction of the shaft 22. Here, the bottom wall 13*b* constitutes a partition wall separating the motor chamber 18 and the impeller chamber 15 and the bottom wall through hole 13*b*1 constitutes a rotating shaft passing hole for the shaft 22.

Further, a plate through hole 12*a* is formed through the seal plate 12. The plate through hole 12*a* is adjacent to the bottom wall through hole 13*b*1 and connected thereto. Also, the shaft 22 extends through the plate through hole 12*a* and the bottom wall through hole 13*b*1 into the motor chamber 18. In this state, the axial direction of the shaft 22 is along the direction that the cylindrical side wall 13*a* of the motor case 13 extends.

An opening 28 is provided between the impeller chamber 15 and the motor chamber 18. In the present embodiment, the opening 28 is constituted by the bottom wall through hole 13*b*1 at the bottom wall 13*b* of the motor case 13 and the plate through hole 12*a* of the seal plate 12. The opening 28 functions as space for the shaft 22 to pass between the impeller chamber 15 and the motor chamber 18.

The opening 28 also functions as an inlet where air is able to pass therethrough between the impeller chamber 15 and the motor chamber 18. Although those skilled in the art can define the meaning of "able to pass" as needed on the basis of the descriptions herein, "able to pass" may mean for example: that there is such an opening cross sectional area that if there arises any air pressure difference between the opposite ends of the opening 28 in a state wherein both the impeller chamber 15 and the motor chamber 18 are closed, the air pressure difference between the opposite ends becomes negligible within a comparatively short period (for example less than 1 second, but this may be less than 0.5 second, less than 1.5 seconds, less than 2 seconds, etc.). Note that, in the present embodiment, the opening 28 is not provided with any seal structure for separating the impeller chamber 15 from the motor chamber 18.

A peripheral surface 22*c* of the shaft 22 is supported by a first bearing 23 and a second bearing 24, provided within the motor chamber 18, to be rotatable in a circumferential direction. The first bearing 23 supports the shaft 22 in the vicinity of the bottom wall 13*b* and the second bearing 24 supports the shaft 22 in the vicinity of an end 22*b* at a side of the end plate 14. The first and second bearings 23 and 24 both comprise a respective outer ring and inner ring, which are rotatable with respect to each other. The first and second bearings 23 and 24 are for example ball bearings. Also, in the present embodiment, the first and second bearings 23 and 24 are grease sealed type angular bearings.

The first bearing 23 is located adjacent to the bottom wall through hole 13*b*1. The first bearing 23 is supported and fixed by a first bearing sleeve 25. The first bearing sleeve 25 has a flanged cylindrical shape surrounding a periphery of the first bearing 23. The first bearing sleeve 25 is fixed to the bottom wall 13*b*. An inner diameter of the bottom wall through hole 13*b*1 is less than an outer diameter of the first bearing 23. The first bearing 23 closes the gap between the bottom wall 13*b* and the shaft 22 by being located at the bottom wall through hole 13*b*1 in the opening end at the side of the motor chamber 18.

The second bearing 24 is supported and fixed by a second bearing sleeve 26. The second bearing sleeve 26 has a flanged cylindrical shape surrounding a periphery of the second bearing 24. The second bearing sleeve 26 is fixed to the end plate 14.

The shaft 22 passes inside a through hole 41 at the center of the impeller 40 at the side of an end 22*a*. A fixing nut 27 is attached to the shaft 22 on the peripheral surface 22*c*. The fixing nut 27 is positioned at the side of the end 22*a* with respect to the impeller 40 and screwed together onto the shaft 22 in a left-handed-screw manner.

The shaft 22 includes an overhanging portion 22*d* having a free end. The overhanging portion 22*d* means a portion of the shaft 22 which is closer to an end with respect to the portion wherein the shaft 22 is supported. In the example of FIG. 1, the overhanging portion 22*d* is defined to be a portion from the end 22*a* to a front end 23*a* of the first bearing 23 (i.e. an axial end of the first bearing 23 closer to the end 22*a* of the shaft 22).

Within the motor chamber 18 and between the first and second bearings 23 and 24, a cylindrical rotor core 31 is provided on the peripheral surface 22*c* of the shaft 22 so that rotor core 31 rotates integrally with the shaft 22. Permanent magnets 32 are embedded within the rotor core 31 along the peripheral surface thereof.

Also, within the motor chamber 18, a cylindrical stator core 33 is provided so that the stator core 33 surrounds the periphery of the rotor core 31. The stator core 33 is fixed to the side wall 13*a* of the motor case 13. Further, a winding is wound in the stator core 33. The winding forms a coil 34 (a line winding) and protrudes at the opposite ends of the stator core 33.

If power is supplied to the winding, the coil 34 generates a rotating magnetic field. The permanent magnets 32 receive working of the rotating magnetic field and the rotor 31 is thereby driven to rotate together with the shaft 22 and the impeller 40.

The shaft 22, the rotor core 31, the permanent magnets 32, the stator core 33 and the coil 34 described above constitute the electric motor 30. Also, the shaft 22 serves as a rotational shaft which is common between the impeller 40 and the electric motor 30.

The driving portion 2 comprises a seal structure for separating the motor chamber 18 from the exterior at portions other than the opening 28. In the present embodiment, the seal structure includes O-rings 50, 51 and 52. The O-ring 50 separates the motor chamber 18 from the exterior between the seal plate 12 and the motor case 13. The O-ring 51 separates the motor chamber 18 from the exterior between the motor case 13 and the endplate 14. The O-ring 52 separates the motor chamber 18 from the exterior between the end plate 14 and the rear end member 35. It can be said that the seal structure also includes the seal plate 12, the motor case 13, the end plate 14 and the rear end member 35.

Next, operation of the electric supercharger 101 related to the first embodiment of the invention will be explained below.

Referring to FIG. 1, if power is supplied by a power source (not shown) to the coil 34 of the electric motor 30, the rotor core 31 is driven to rotate by the rotating magnetic field generated by the coil 34, thereby driving the shaft 22 and the impeller 40 to rotate at a high speed around a central axis CA. Upon this, the impeller 40 compresses, i.e. supercharges, air sucked from the intake path 16 and pumps it to the discharging path 17.

Here, the opening 28 is not sealed, so the air compressed within the impeller chamber 15 can flow into the motor chamber 18 through the opening 28. However, the motor chamber 18 is separated from the exterior at portions other than the opening 28, so it is suppressed that the air flown into the motor chamber 18 flows out thereof at portions other than the opening 28.

If shaft 22 rotates upon operation of the electric supercharger 101, the end 22a vibrates due to rotational vibration. Because the shaft 22 is supported by the first and second bearings 23 and 24, the amplitude of the vibration of the end 22a depends on the length of the overhanging portion 22d. In the present embodiment, there is no need to provide any seal structure in the opening 28, so the axial length of the opening 28 can be designed to be short (for example, the seal plate 12 or the bottom wall 13b of the motor case 13 can be thin), and the length of the overhanging portion 22d can be short. As a result, the amplitude of the vibration of the end 22a due to the rotational vibration can be reduced.

Thus, in accordance with the electric supercharger 101 related to the first embodiment, the amplitude of the vibration of the end 22a due to the rotational vibration can be reduced. Also, because there is no need to provide any seal collar, seal ring, etc. around the shaft 22, both assembly precision of the rotating body including the shaft 22 and the dynamic balance are improved. Further, cost can be reduced because the number of parts is reduced.

Also, the motor chamber 18 is separated from the exterior at portions other than the opening 28, so the compressed air does not leak out. Accordingly, the amount of compressed air leaking is reduced and compressor efficiency is improved.

Here, conventional electric superchargers separate the impeller chamber from the motor chamber by using a seal collar, a seal ring, etc., whereas they do not separate the motor chamber from the exterior. In such a construction, sealability is sacrificed to a certain degree in order to guarantee the smooth rotation of a shaft, so the amount of leakage is greater. Accordingly, it can be said that the electric supercharger 101 of the present embodiment reduces the amount of compressed air leakage, even in comparison with conventional constructions.

Also, those skilled in the art could not easily conceive of a construction wherein the motor chamber 18 is separated from the exterior at least at the portions other than the opening 28 because such a construction might make it more difficult to supply a lubricant (oil or the like) from the exterior into the motor chamber 18. Regarding this point, the present embodiment solves the problem related to supplying the lubricant by making the supply of lubricant unnecessary because the first and second bearings 23 and 24 are grease sealed type bearings. However, non-grease sealed type bearings may be used in the construction if, for example, the motor chamber 18 can be sealed while lubrication of the bearing can be maintained sufficiently.

In the present embodiment, the opening 28 is not provided with any seal structure for separating the impeller chamber 15 from the motor chamber 18. In an alternative example, a seal structure may be provided for purposes other than to suppress air flow in the opening 28. Also, a structure or the like for suppressing the air flow to a certain degree may be provided between the impeller chamber 15 and the motor chamber 18 if it is possible to maintain a certain degree of air flow.

Also, the construction of the opening 28 may be changed. In the present embodiment, the opening 28 is constituted by the bottom wall through hole 13b1 in the bottom wall 13b of the motor case 13 and the plate through hole 12a of the seal plate 12. In an alternative example, an additional component can be provided. Further, in the present embodiment, an inner surface of the bottom wall through hole 13b1 and an inner surface of the plate through hole 12a constitute respective cylindrical surfaces. In an alternative example, they may include a surface in a non-cylindrical shape. For example, one or both of them may have a shape in which a cross section perpendicular to the axis is non-circular, or have varying cross sectional shapes in response to positions in an axial direction (e.g. a tapered surface). Also, in the example of FIG. 1, the diameter of the bottom wall through hole 13b1 is greater than the diameter of the plate through hole 12a. In an alternative example, the diameter of the bottom wall through hole 13b1 may be less than the diameter of the plate through hole 12a or they may be equal to each other.

Second Embodiment

A second embodiment is related to a supercharging system comprising the electric supercharger 101 related to the first embodiment.

Figure 2:
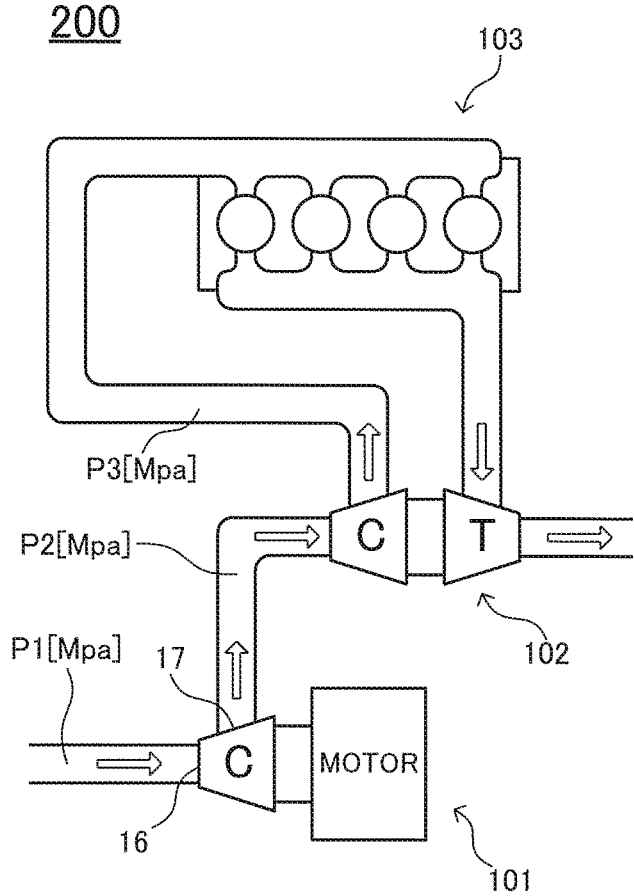
FIG. 2 is a schematic view showing a construction of the supercharging system related to a second embodiment of the present invention.

FIG. 2 shows a schematic construction of the supercharging system 200 related to the second embodiment. The supercharging system 200 has a construction typically referred to as "two-stage turbocharging" and compresses and supercharges the intake air in two stages.

The supercharging system 200 supercharges the intake air of an internal combustion engine 103. For this purpose, the supercharging system 200 comprises an electric supercharger (a first supercharger) 101 related to the first embodiment and a second supercharger 102. The first supercharger 101 is a supercharger in a lower pressure side. The first supercharger 101 compresses air of a predetermined first pressure P1 (e.g. atmospheric pressure) to a predetermined second pressure P2 higher than the first pressure P1 and supplies this to the second supercharger 102.

Note that FIG. 2 merely shows a schematic construction. Although an intercooler, a switching structure including a check valve, etc. is omitted therein, they may be provided as needed.

The second supercharger 102 is a supercharger in a higher pressure side. In the present embodiment, the second supercharger 102 supercharges the intake air by utilizing a discharge pressure of the internal combustion engine 103. The second supercharger 102 is provided in the downstream of the first supercharger 101. The second supercharger 102 compresses the air of the second pressure P2 supplied by the first supercharger 101 to a predetermined third pressure P3 higher than the second pressure P2 and supplies this to the internal combustion engine 103.

Here, referring to FIG. 1, the first supercharger 101 generates heat inside as it operates and the temperature within the motor chamber 18 rises. On the other hand, the compressed air of the discharging pressure (the second pressure P2) flows into the motor chamber 18 through the opening 28, so the chamber temperature within the motor chamber 18 varies in response to the temperature of the compressed air. Accordingly, if a charging ratio of the first supercharger 101 is designed so that the temperature of the compressed air is lower than a predetermined threshold temperature, the interior of the motor chamber 18 can be cooled by the compressed air when the temperature within the motor chamber 18 becomes equal to or higher than the threshold temperature.

For example, the first supercharger 101 can be designed so that the temperature of the compressed air of the second pressure P2 is equal to or lower than 70 degrees Celsius. In this case, a significant cooling effect can be obtained within the motor chamber 18. In particular, as shown in FIG. 1, the first bearing 23 is located in the vicinity of the opening 28 within the motor chamber 18, so a great cooling effect can be obtained for the first bearing 23.

Note that the second supercharger 102 is provided downstream of the first supercharger 101. So, even if the second pressure P2 is a comparatively low pressure, compressed air of the third pressure P3 which is sufficiently supercharged can be supplied to the internal combustion engine 103.

Thus, according to the supercharging system 200 related to the second embodiment, the first bearing 23 can be cooled efficiently through the opening 28 in the first supercharger 101. Also, in a manner similar to the first embodiment, the amplitude of the vibration of the end 22a due to the rotational vibration can be reduced in the supercharger 101.

Although the second supercharger 102 in FIG. 2 is not an electric supercharger, this may also be an electric supercharger similar to the first supercharger 101 if cooling can be performed appropriately. Also, in the case wherein cooling can be performed appropriately, if the second supercharger (i.e. the supercharger in the higher pressure side) is an electric supercharger, the first supercharger (i.e. the supercharger in the lower pressure side) can be a supercharger of a non-electric type (e.g. one utilizing a discharging pressure in a manner similar to the second supercharger 102 in the second embodiment).

In the second embodiment, an additional supercharger can be provided. For example, the additional supercharger can be placed upstream of the first supercharger 101, between the first supercharger 101 and the second supercharger 102, downstream of the second supercharger 102, etc.

The above embodiments are merely exemplary and can be modified within the scope of the present invention defined by the appended claims.

The invention claimed is:

1. An electric supercharger comprising:
an impeller for supercharging a fluid by rotation;
an impeller chamber for accommodating the impeller;
a motor for driving the impeller to rotate;
a motor chamber for accommodating the motor;
a rotating shaft which is common between the impeller and the electric motor;
an opening for connecting the impeller chamber and the motor chamber, through which the rotating shaft that extends from the impeller chamber to the motor chamber passes, and through which the fluid is able to pass between the impeller chamber and the motor chamber; and
a seal structure for separating the motor chamber from an exterior at portions other than the opening such that the fluid within the motor chamber does not leak out of the motor chamber at portions other than the opening, wherein:

the seal structure includes a seal plate,
the impeller chamber is formed by a compressor cover and the seal plate assembled to the compressor cover,
the electric supercharger has a motor case, the motor case being fixed to the seal plate, the motor case accommodating the motor, and
the seal plate is directly exposed to outside of the electric supercharger, wherein the seal plate has a larger outer diameter than both of the compressor cover and the motor case, so that the compressor cover and the motor case do not directly contact each other,
wherein:
the opening has a plate through hole formed in the seal plate and a motor case through hole formed in the motor case so as to be adjacent to the plate through hole and connected to the plate through hole;
the seal structure has a first seal member disposed between and in direct contact with the seal plate and the motor case at a location radially outward from the opening, that separates the motor chamber from the exterior of the motor case and wherein the first seal member is an O-ring; and
the opening is not provided with any seal structure for separating the impeller chamber from the motor chamber.

2. The electric supercharger as claimed in claim 1, wherein:
the electric supercharger further comprises the rotating shaft and a bearing for supporting the rotating shaft to be rotatable, wherein the bearing is located inside the motor chamber; and
the bearing is of a grease sealed type.

3. A supercharging system comprising:
a first supercharger which is the electric supercharger as claimed in claim 1; and
a second supercharger provided downstream of the first supercharger.

4. The electric supercharger as claimed in claim 1, further comprising a rear end closure structure for closing a motor case opening at a side of the motor case opposite to a seal plate side, wherein the seal structure comprises a second seal member for sealing between the motor case and the rear end closure structure.

5. The electric supercharger as claimed in claim 4, wherein:
the rear end closure structure has an end plate and a rear end member attached to the end plate;
the second seal member seals between the motor case and the end plate; and
the seal structure comprises a third seal member for sealing between the end plate and the rear end member.

6. The electric supercharger as claimed in claim 2, wherein:
the bearing includes a first bearing located adjacent to the motor case through hole;
the first bearing is supported by a bearing sleeve fixed to the motor case; and
an inner diameter of the motor case through hole is less than an outer diameter of the first bearing.

7. The electric supercharger as claimed in claim 1, wherein the shaft includes an overhanging portion that extends from a free end of the shaft disposed outside the impeller, to a portion of the shaft that is located at an end of a first bearing disposed adjacent to the opening, wherein the first bearing closes a gap between the opening and the shaft.

* * * * *